United States Patent Office 2,781,237
Patented Feb. 12, 1957

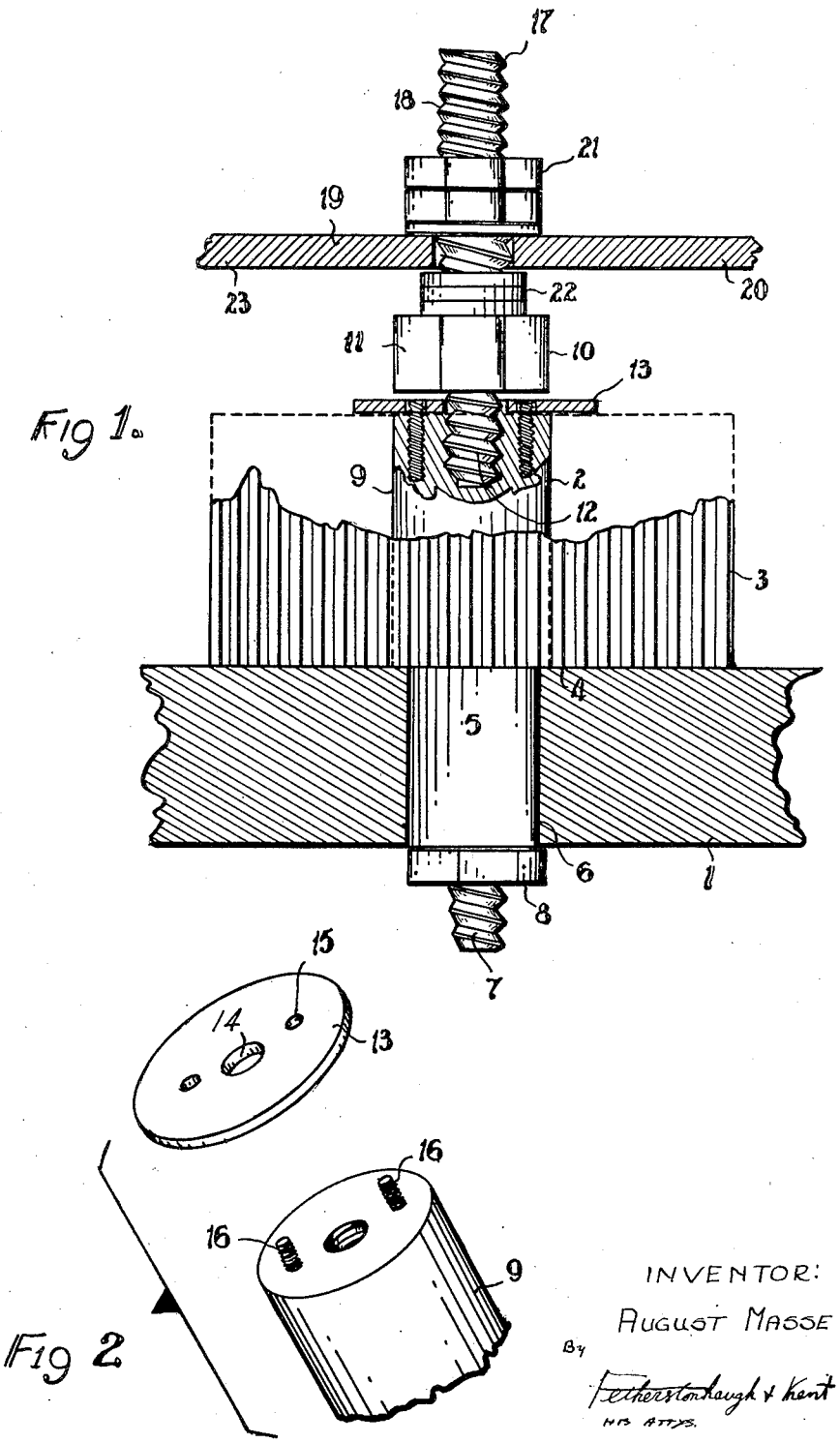

2,781,237

GEAR SHAFT SUPPORT

August Masse, Humboldt, Saskatchewan, Canada

Application October 23, 1953, Serial No. 388,012

1 Claim. (Cl. 308—18)

My invention relates to new and useful improvements in supports for gear shafts, and particularly for idler gear shafts of the type which normally are supported at one end thereof, an object of my invention being to provide a device of the character herewithin described which is adapted to support the free end of stub shafts, thus reducing the strain thereon.

A further object of my invention is to provide a device of the character herewithin described which reduces chattering or vibration of the idler gears, thus protecting the remainder of the gear train.

Another object of my invention is to provide a device of the character herewithin described which is adapted to be fitted to existing idler gear shafts with a minimum of alteration.

Still another object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side sectional elevation of an idler gear shaft assembly with my device in situ.

Figure 2 is a fragmentary perspective view of one end of the idler gear shaft.

In drawings like characters of reference indicate corresponding parts in the different figures.

Many internal combustion engines are provided with a gear train driven from the crank shaft, from which various components, such as cam shafts, fuel pumps, magnetos and the like may be driven, and it is conventional in these gear trains to provide an idler gear in order to maintain the correct direction of rotation of the various components.

Many of these engines, particularly those adapted for use in farm tractors and the like, incorporate an idler gear mounted upon a shaft, which is secured by one end only to the engine casing and it will be appreciated that vibration or chattering may occur within the gear train, which throws a considerable strain upon the idler gear shaft and in fact often causes same to loosen within the empty casing so that an elongated aperture is formed. It will be appreciated that, with a continuation of the vibration, accentuated by the elongated aperture, damage quickly results to the gear train, thus necessitating a relatively expensive repair.

I have found that this trouble can be almost completely eliminated merely by supporting the opposite end of the idler gear shaft.

Proceeding now to describe my invention in detail, it will be seen upon reference to the accompanying drawings that I have illustrated fragmentarily part of the engine casing 1 and an idler gear shaft 2 having an idler gear 3 mounted for rotation thereon. The idler gear shaft 2 is reduced or shouldered at 4 and the reduced portion 5 passes through an aperture 6 within the engine casing 1 and is provided with a screw threaded extremity 7 by which means, in association with a nut 8, the idler gear shaft is clamped to the engine casing 1.

It will be appreciated under this construction, that the distal or outer end 9 of the idler gear shaft is unsupported and that any movement or vibration is transmitted directly to the walls of the aperture 6 through the engine casing 1.

My device collectively designated 10 comprises a stub shaft 11, which may be cylindrical when viewed in cross-section or hexagonal to facilitate fitting as desired.

The inner end 12 of this stub shaft is reduced in diameter with respect to the main portion 11 and is screw threaded so that it can be received within the end 9 of the idler gear shaft, which is apertured concentrically and screw threaded to receive the end 12 of the stub shaft. In this connection, means are provided to retain the idler gear 3 in position, said means comprising a bearing plate 13 centrally apertured as at 14 to permit passage of the end 12 of the stub shaft.

In order to prevent the rotation of the end plate 13, further apertures 15 are provided therethrough which are adapted to engage over studs 16 extending from the end 9 of the idler gear shaft.

In this connection, it should be explained that a plate similar to the plate 13 is secured to the end of the idler gear shaft in the original manufacture, said plate being secured by cap screws and it is only necessary to provide the apertures 14 in this plate and cut off the heads of the cap screws to provide the structure hereinbefore described.

The opposite end 17 of the stub shaft is also reduced in diameter with respect to the main portion 11, and screw threaded upon part of its length, as indicated by the reference character 18. This end is adapted to pass through an aperture 19 formed in the conventional gear cover 20, the walls of the aperture 19 forming the bearing support member for the outer end of the stub shaft. Lock nuts 21 are engageable over the screw threaded end 17 and clamp the assembly solidly in position, resilient washers 22 being provided as required between the main portion 11 and the inner face 23 of the gear cover 20, which act as spacers and also as oil seals.

It will, therefore, be appreciated that I have provided an outboard support for the idler gear shaft 2, which is readily adaptable for fitting into existing engines with the minimum of structural alterations thereto.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

The combination of a machinery frame, an idler shaft rigidly secured in an aperture in said frame and projecting outwardly therefrom, an idler gear rotatable on said idler shaft, the outer end portion of the idler shaft being formed with a screw-threaded bore, a support member rigid with said frame and provided with an opening coaxial with and spaced outwardly from the outer end of said idler shaft, a stub shaft having an enlarged intermediate portion and first and second screw-threaded end portions, the first screw-threaded end portion of said stub shaft engaging said screw-threaded bore of the idler shaft, the second screw-threaded end portion of the stub shaft extending through said opening in said support member, a compression washer interposed between said support member and the enlarged intermediate portion of the stub shaft, a clamping nut provided on said second end portion of the stub shaft and urging said washer in sealing engagement with the support member, and an apertured keeper disc provided on the outer end of said idler shaft for retaining said gear thereon, said first end portion of said stub shaft extending through the aperture in said keeper disc, whereby to support the outer end of the idler shaft and said gear against vibration.

References Cited in the file of this patent

UNITED STATES PATENTS 2,369,421    Warren  ---------------- Feb. 13, 1945

FOREIGN PATENTS 982,142    France  ------------------ June 4, 1951